July 14, 1931.   A. B. DU MONT   1,814,437
APPARATUS AND METHOD FOR TESTING ELECTRICAL DEVICES
Filed Feb. 16, 1927   3 Sheets-Sheet 1

INVENTOR
A. B. DUMONT
BY
ATTORNEY

July 14, 1931.  A. B. DU MONT  1,814,437
APPARATUS AND METHOD FOR TESTING ELECTRICAL DEVICES
Filed Feb. 16, 1927    3 Sheets-Sheet 2

INVENTOR
A. B. DUMONT
BY
ATTORNEY

July 14, 1931.  A. B. DU MONT  1,814,437
APPARATUS AND METHOD FOR TESTING ELECTRICAL DEVICES
Filed Feb. 16, 1927  3 Sheets-Sheet 3

INVENTOR
A. B. DUMONT
BY
ATTORNEY

Patented July 14, 1931

1,814,437

UNITED STATES PATENT OFFICE

ALLEN B. DU MONT, OF BLOOMFIELD, NEW JERSEY, ASSIGNOR TO WESTINGHOUSE LAMP COMPANY, A CORPORATION OF PENNSYLVANIA

APPARATUS AND METHOD FOR TESTING ELECTRICAL DEVICES

Application filed February 16, 1927. Serial No. 163,541.

This invention relates to the inspection of electrical devices, such as radio tubes and the like, and more particularly to a method and apparatus for testing and sorting such devices in accordance with their different characteristics or defects.

In the manufacture of certain types of electrical devices, such for example as tubes employed in radio receiving and transmitting circuits, it is highly desirable that such devices have uniform electrical characteristics. In the production of such devices, in order to insure a given standard of excellence or quality it is necessary that the finished product come within limits specified in standard specifications covering the operating characteristics of the tube. All tubes must therefore be tested before leaving the factory, and any that do not answer the requirements set forth in the manufacturing specification are rejected and either rejuvenated or destroyed, as the case may be.

Certain physical defects which occur in the manufacture of radio tubes are of a mechanical nature, and therefore clearly visible or easily detected. However, other defects relating to the electrical characteristics of the tube cannot be readily detected except by the employment of certain electrical instrumentalities operable to produce visible indications of such defects. Of course defects of this nature are in reality largely due to tubes not conforming to the requirements of the specification, which results in a more or less arbitrary rejection of a certain percentage of the product.

For example, it is well known that a given type of radio tube must operate within certain limits of plate current when a specified filament, grid and plate voltage are applied in order to give satisfactory operation. Such tubes must also be capable of producing a given electron emission and must be substantially free from gas. All of the above conditions are carefully measured, and if during the inspection of a tube it is found that the plate current varies outside of a given range or the emission is below a given range, or if the tube is gassy and ionization occurs, such tube is considered as a reject. Certain of these tubes may, however, be recovered by subjecting them to what is termed a "reseasoning" operation; others may be reconditioned by readjusting the electrodes, etc. If, however, the tube has become short-circuited by reason of a break in the filament, it is usually more profitable to discard the tube entirely. It will thus be evident that in testing radio tubes the various defects must be carefully observed, and inasmuch as a short-circuited tube is beyond practical repair and tubes having other defects such as low plate current or low emission may be easily corrected, it is desirable to separate or classify the tubes according to particular defects, so that the proper steps may be taken to discard certain defective tubes and to salvage others.

It has heretofore been the practice in the manufacture of radio tubes to provide manually operated means whereby an operator might have visible indication of any electrical defect within a tube. For illustration, heretofore a circuit was provided containing a milli-ammeter to indicate the flow of plate current. The operator would then insert the tube in such a circuit and watch the dial on the meter to note whether the needle moved below or above a given mark or out of the range specified for a commercially satisfactory tube. This method was not only uncertain, owing to the dependency on the alertness and integrity of the operator, but was extremely slow, since each tube was manually inserted and removed from the circuit.

Developments in the radio tube industry have rapidly advanced toward the automatic high speed production of the radio tube. The manual inspecting of the tubes, therefore, had a tendency to slow up production and owing to the labor involved materially increased the cost thereof.

An object of the present invention is, therefore, to provide a method for automatically and expeditiously inspecting electrical devices.

Another object of the invention is to provide a method of separating or classifying electrical devices into groups in accordance with predetermined characteristics.

Another object of the invention is to provide an apparatus to receive radio tubes and capable of ejecting tubes having like defects into common groups.

Another object of the invention is to provide a plurality of sensitive electrical circuits in combination with co-ordinated mechanical elements operable upon the closing or breaking of said circuits, depending upon a given defect in an electrical device undergoing inspection.

Other objects and advantages of the invention resulting from circuit organizations and apparatus controlled thereby will be appreciated from the following description and accompanying drawings in which:—

Briefly, the invention includes a testing apparatus in which devices to be tested, such as radio tubes, are placed in sockets on a rotatable conveyor in the form of a disc. The disc is provided with contact members or tracks connected to the sockets and brushes are provided to successively connect the tracks with a plurality of electrical circuits. The various circuits are arranged so as to be normally set to cause mechanism to eject a defective tube, but if a tube is good, that is, free from defects, the various instrumentalities of the circuits are actuated to prevent the ejection of the tube.

The arrangement of the various actuating elements is such that the test circuits are first connected up allowing the provided meters and relays, etc., to come to fixed positions before a power ejector circuit is connected. This serves a double purpose in that greater speed is attained, because the ejector circuit is not connected in while the meters and relays are becoming stabilized and it permits the system to be operated with all the circuits set at "danger" that is to eject a tube when the various settings are normal.

Although the present invention may be applicable for the testing of various types of electrical elements such, for example, as resistance units, transformers, electrical incandescent lamps or the like, as a practical embodiment of the invention, the same will be shown and described hereinafter as applied to the testing of a radio tube, such for example as that shown in Fig. 2.

Figures 6, 7, 8, 9, 10:
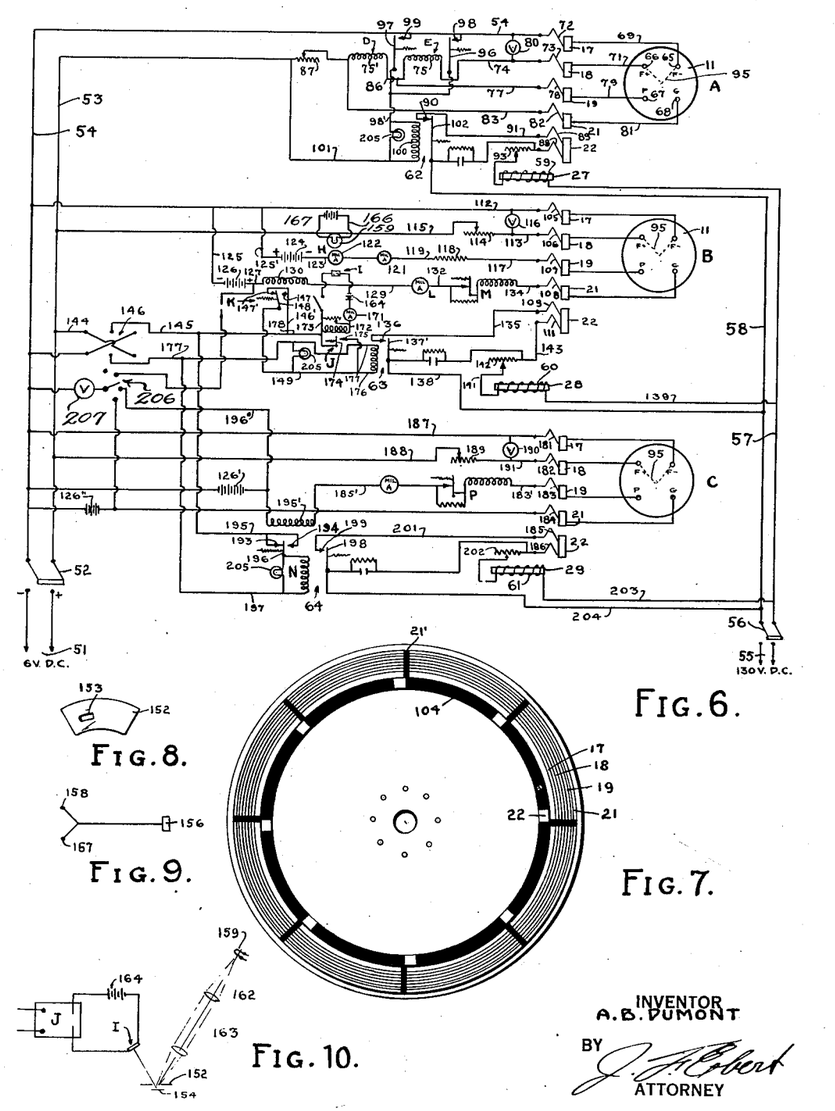
Fig. 6 is a diagram of the circuits employed in connection with the present machine.
Fig. 7 is a view of the contact surface of the rotary conveyor employed as part of the present machine.
Fig. 8 shows a perforated face of a meter employed in the above circuit.
Fig. 9 shows a pointer in the form of a shutter operable in connection with the said meter face.
Fig. 10 is a diagrammatic view of a circuit including a selenium cell.

The selected embodiment of the invention may include a machine comprising a conveyor 10 which may be in the form of a circular disc having a plurality of sockets 11 disposed in spaced relation adjacent to its periphery. The conveyor may be mounted at one end of a horizontal shaft 12 and rotatable in a vertical plane. The shaft 12 may be mounted in bearings 13 and 14 suitably secured to a supporting structure or table 15. The opposite end of the shaft 12 may be provided with a chain sprocket 16 connected by a chain 16' to a sprocket at one end of a shaft 17' driven through a standard reduction drive 18' connected to a motor 19' or any other suitable source of power. The conveyor may be rotated continuously in the direction of the arrow X and articles such as radio tubes may be loaded at 20 (see Fig. 3). The rear side of the disc may be provided with a plurality of sets of segmental contacts, each set including tracks 17, 18, 19 and 21 arranged in concentric formation as shown in Fig. 7. A fifth contact or track 22 is provided for purposes to be presently set forth.

It is to be understood that the various conductors may be suitably insulated from each other or the disc itself may be of an electrical non-conductive material having the contacts embedded therein. The side of the conveyor having the tracks or contacts thereon may be termed the contact surface and this surface is disposed adjacent to the table or supporting structure of the machine. Flexible contact (see Fig. 1) terminals or brushes 23, 24, 25 and 26 connected to an electrical circuit, to be later described, are secured to the frame work of the machine and arranged to make contact with the tracks 17, 18, 19 and 21 respectively, thus when a tube is positioned in the conveyor it may be moved to constitute part of an electrical circuit and a flow of electrical energy may be passed through the various elements of the tube during a movement of the conveyor. By reason of the passage of electrical energy through the tube while the same is moving, it is possible to utilize a variation in the flow of such energy to cause mechanism to operate which under certain conditions will eject a tube at a certain position.

Figures 3, 4, 5:
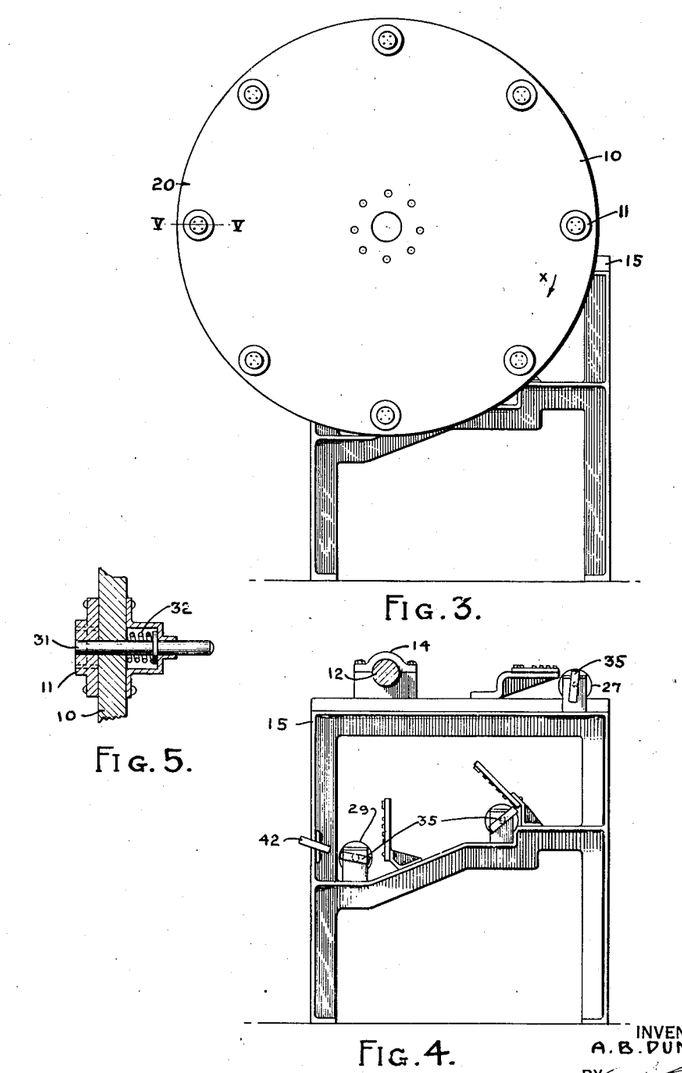
Fig. 3 is a front elevational view of the machine shown in Fig. 1 but with the fore part or chutes removed.
Fig. 4 is a view taken on line IV—IV in Fig. 1.
Fig. 5 is a detailed sectional view of a socket taken on line V—V in Fig. 3.

For this purpose, a plurality of solenoids 27, 28 and 29 are mounted on the supporting structure 15 in suitable positions adjacent to the path of travel of the sockets which carry the tubes. Each of the sockets as shown in Fig. 5 is constructed with a plunger 31 which is normally held by a spring 32 to project from the rear contact surface of the conveyor 10. The solenoids are constructed in the usual manner with a coil 33 and an armature 34, the armature constituting an ejector rod, an end 35 of which is adapted to engage the plunger 31 of a socket to eject a tube. Helical springs 36 normally maintain the ejector rods from movement toward the sockets when the coil 33 is de-energized.

Although a solenoid is shown and described, it is obvious that any suitable electrically actuated mechanism may be employed. For example, a motor might be energized to actuate a cam or other element to eject a tested device.

The brushes are each connected to electrical circuits which are affected by the condition of the various tubes to operate the solenoids and discharge a tube according to the particular defect which affects a given circuit.

It is thought that a full understanding of the electrically controlled mechanism of the device will be had from the foregoing description. The above mechanism is operable in conjunction with electrical circuits to be hereinafter more fully described and when the machine is operated and a radio tube is inserted into a socket and such tube possesses a broken filament or the flow of current from the filament is otherwise terminated or short circuited, the solenoid 27 will be actuated to discharge the tube into a chute 37. If the tube is good in so far as filament current is concerned but has not the proper emission or has a gas current above the limit, the solenoid 28 will be operated at the time the tube reaches a position adjacent thereto and such tube will be ejected from the socket and discharged into chute 38. If the tube does not possess the above mentioned defects but does not have the required plate current, it will, upon reaching the solenoid 29, be ejected into chute 39. Tubes passing the several solenoids will obviously be free from defects and will be discharged into a chute 41 by reason of a fixed cam member 42 which may be secured to the table 15 for engagement with a plunger 31 of a socket. The cam 42 obviously ejects all tubes that pass the several stages at which the solenoids are disposed.

By reason of the discharge of tubes having different defects into different chutes, it will be understood that such tubes may be guided to different receptacles and tubes having common defects will thus be assorted into different groups.

The tubes discharged into the chute 37 possess broken filaments or short circuited elements and are usually destroyed or otherwise discarded; the tubes passed through the other chutes, however, may then be subjected to such treatment as will bring back their proper characteristics, after which they may again be applied to the present testing apparatus to ascertain whether any defects have remained.

It will be understood from the foregoing that by reason of the present invention the various defects which may occur in different tubes are utilized to actuate mechanism for ejecting tubes having like defects into a common receptacle.

It may be possible to operate the various solenoids in various ways, or to test the tubes by electrical instruments and circuits which vary somewhat from the present system and it is to be understood that the herein described system is given only as an example of a practical embodiment of the invention and although it may be possible to test the tubes by measuring the amount of current and fixing a range of voltages for such circuit, it has been found preferable to perform the test operation by a determination of the operativeness of the tube in accordance with the voltage.

The diagrammatic presentation of the several circuits shown in Fig. 6 may now be considered. This circuit may, for the sake of a more clear understanding, be divided into three parts or supplemental circuits indicated by the reference characters A, B and C.

Referring generally to this circuit as a whole, it will be noted that a suitable source of electrical energy to light the filaments of radio tubes to be tested, may be provided from 6 volt D. C. line 51 connectable by a double pole single throw switch 52 which connects the source with leads 53 and 54. This source is common to the three circuits. The passage of current to the tubes is attained by means of the contact rings 17, 18, 19 and 21 and it will be noted by reference to Fig. 7 that these rings are each divided in to sections separated by transverse insulating inserts 21' thus providing a set of tracks for each tube, that is, each position or socket on the conveyor is connected with a set of the tracks so that brushes to be later described may connect the sockets with the circuit during a given movement of the conveyor.

Electrical energy for operating the several solenoids 27, 28, and 29 may be supplied from any suitable source as from a 130 volt D. C. line indicated by the numeral 55 which may be connected by a double pole single throw switch 56 to conductors 57 and 58, the conductor 57 leading directly to the coils 59, 60 and 61 of the solenoids 27, 28 and 29 respectively, and the conductor 58 leading directly to relays 62, 63 and 64 of the circuits A, B and C respectively for operating the several solenoids.

Circuit A operates to actuate the solenoid 27 to eject tubes having the following defects which may be termed "A" defects:

Open filaments, filament to plate short circuit, grid to plate short circuit.

The essential features of this circuit are two telephone relays D and E and which may be termed master relays, a protective resistance and the power control relay 62 which operates the solenoid 27.

When a good tube or one not having one or more of the above defects is disposed in a socket, it constitutes part of the circuit and current flows through the telephone relay and breaks a contact which opens the circuit to the power-control-relay 62. The solenoid will therefore not operate and the tube will pass to the next position.

If the tube is open or short circuited then no current flows through the relays D and E and the contacts of these relays remain closed, thus the power-control-relay 62 is energized closing the circuit energizing the solenoid to eject the tube. The protective resistance is provided to prevent the storage battery from being short circuited when a minus filament to grid short circuit occurs.

Tubes ejected by this circuit are considered as useless from a manufacturing standpoint and are usually discarded.

Circuit B operates to actuate the solenoid 28 to remove tubes having the following defects which may be termed "B" defects:

Gassy tubes, minus filament to plate leakage, plus filament to plate leakage, grid to plate leakage, low emission tubes, as well as tubes having the same defects as enumerated for circuit A.

This part of the testing apparatus includes a plate circuit and a grid circuit. The plate circuit includes a microammeter of the usual type as a check and a microammeter H provided with a shutter, also a protective resistance as well as the required batteries. The microammeter H is associated with a source of light controlled by a series of lenses for directing light to a selenium cell I which normally acts as a resistance. A sensitive or master relay J is also provided as well as the required batteries.

The grid circuit of this part of the apparatus includes a sensitive or master relay K so constructed that an actuation thereof is proportional to the current in that circuit, also a milliammeter L, a protective relay M with a suitable resistance as well as the required batteries.

Briefly, the circuit just outlined operates as follows:

If a tube to be tested has the required emission the relay K in the grid circuit operates so the contact arm thereof does not make contact; that is, the amount of current is within a given range. Should the emission be below the required range, however, the arm makes contact. When the contact is made by this relay the power-control-relay 63 is energized, operating the ejector or solenoid 28 to discard the tube.

If a tube is good with regard to emission but has less than the required gas current, the shutter on the microammeter H will not move far enough to allow light from the light source to be directed on the selenium cell I. Should the gas current be above the given limit, the shutter will move and permit light to be directed to the selenium cell thus decreasing its resistance and causing a flow of current in its circuit to operate the master relay J which in turn operates the power-control-relay 63 causing an actuation of the solenoid 28 to eject the tube. A protective resistance may be provided in the plate circuit to limit the current to the microammeter and the specially constructed microammeter H against damage as would be caused if a short circuit occurred.

The protective relay M is to prevent an excess of current, as in the case of a short circuit, from damaging the sensitive relay or the milliammeter. The action of this protective relay is such that if the current goes above a given value as would be detrimental to any of the control or indicating instruments, the relay will operate and put a resistance in the circuit so as to check the current passing to the master relay or the milliammeter.

It is evident that if a tube has a broken filament it will not have emission or if it is short circuited from grid to plate, both the microammeter H and the master relays K and J would be operated and the tube ejected. Tubes ejected by reason of the operation of circuit B may be reclaimed by subjection to a reseasoning operation.

Circuit C operates to actuate the solenoid 29 to eject tubes having the following defects which may be termed "C" defects:

Low plate current, high plate current, also, open filaments, minus filament to plate short circuit, plus filament to plate short circuit.

This circuit includes a sensitive or master relay N, a protective relay P, and the required batteries in the plate circuit, also the required batteries in the grid circuit and the power-control-relay 64. If a tube has the proper plate current, the arm of the relay N does not make contact. Should the plate current be lower or higher than a given value for which the relay is set, the arm thereof will make contact causing an operation of the power relay 64 to actuate the solenoid 29 and eject the tube.

Tubes ejected by an operation of this circuit may be reclaimed by what is known as "tapping" which means that if a tube is low in plate current by reason of the relative positions of the elements or electrodes, such relation may be changed by a slight impact upon the tube in the right direction.

With regard to the sensitive or master relays referred to, it is pointed out that these relays are essentially meters but instead of having the usual needle, they may have a contact arm which is movable to and from one or more contact members, that is, between an upper and lower range, and may be adjustable to meet the desired conditions. Springs are provided to hold the movable arms to the lower contact, thus the circuit is normally closed and must be opened to permit a flow of current, as in the case of a good tube, or else the tube temporarily constituting part of the circuit will be ejected. It is obvious that if required, the necessary condensers and resistances may be inserted across the contacts in the solenoid or power circuit to prevent sparking.

The foregoing gives a general idea of the various circuits. A more complete understanding thereof will, however, be had from the following detailed description.

Circuit A

Figures 1, 2:
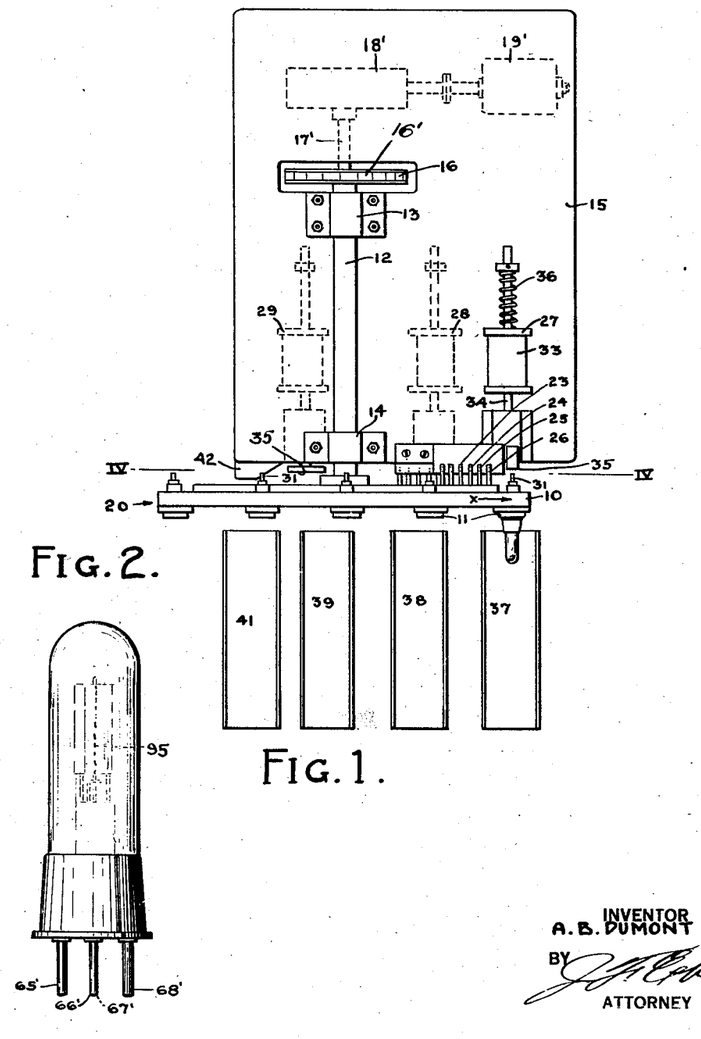
Fig. 1 is a plan view of the mechanical elements of a machine embodying the present invention.
Fig. 2 shows a radio tube as an example of one type of article adapted to be tested.

Considering circuit A which operates to test radio tubes for "A" defects, each of the sockets 11 may be provided with contact members 65, 66, 67 and 68 which engage with contacts 65′, 66′, 67′ and 68′ of a device such as a radio tube shown in Fig. 2. The contacts 65 and 66 may be connected by conductors 69 and 71 to tracks 17 and 18 as hereinbefore described as being positioned on the conveyor 10. Brushes 72 and 73 are provided for running contact with the said tracks, 17 and 18 respectively, the brush 72 being connected by the lead 54 to the source of energy 51. The brush 73 may be connected by a conductor 74 to one side of a coil 75 of master relay E. The opposite end of the coil 75 may be connected by a conductor 77 to a brush 78 engageable with a track 19 which in turn is connected by a conductor 79 with the contact member 67 constituting the plate contact in the socket 11. The grid contact 68 of the socket 11 is connected by a conductor 81 to the track 21 which engages with a brush 82 connected by a conductor 83 to a coil 75′ of the master relay D. The opposite end of the coil of the said relay being connected by a conductor 86 to the coil 75 of master relay E. The conductor 83 is connected to the conductor 53 through a variable resistance 87.

The track 22 which may be termed the power or solenoid contact of the conveyor is adapted to engage with brushes 88 and 89, the brush 89 being connected by a conductor 91 to a contact 90 of the relay 62 and the brush 88 is connected through a variable resistance 93 to an end of coil 59 of the solenoid 27, the opposite end of this coil being connected to the conductor 57.

If a tube is applied to a socket 11, electrical energy will flow from the source 51 through lead 54, brush 72, track 17, conductor 69, filament 95, conductor 71, track 18, brush 73, conductor 74 through the coils 75 and 75′ of the relays E and D, resistance 87 and conductor 53, leading back to the source of energy 51. It will therefore be seen that in the circuit just described when a filament 95 indicated by the dotted line is intact and permits a flow of current through the relays D and E, movable arms 96 and 97 of these relays respectively will be positioned away from contacts 98 and 99 respectively; these contacts being connected to lead 54 connected to the battery 51.

The arms 96 and 97 are connected by conductor 98′ to one side of a coil 100 of power-control-relay 62, the opposite side of the coil being connected to conductor 101 connecting the conductor 53 leading to the source of energy 51. Thus upon a contact of either of the arms 96 or 97 against their respective contacts a flow of energy will occur in the coil 100 of the relay 62. The movable arms 96 and 97 are each provided with the usual spring or tension member which operates to bring the members in engagement with the contacts 98 and 99 when released from the influence of the coils 75 and 75′. Thus a flow of current through the relays, as when the filament is unbroken, will break the circuit comprising leads 53 and 54 which conduct energy from the source 51.

From the foregoing it will be seen that when current flows through the relays D and E, the solenoid 27 is not actuated since the arms 96 and 97 are then moved away from the contacts 98 and 99. If, however, the filament 95 is broken and no current passes through the relays, the contact arms thereof will be actuated by their respective springs to close the circuit to cause a flow of energy through the relay 62, thus effecting a movement of an arm 102 thereof into engagement with the contact 90 of the conductor 91, the arm 102 being connected to the conductor 58 leading to the 130 volt D. C. line 55. A voltmeter 80 may be shunted between leads 54 and 74 to give a reading of the voltage.

The conductor 91 is, as above set forth, connected to the brush 89 so that when the track 22 is disposed in contact with the brushes 89 and 88, current will flow through the variable resistance 93, coil 59 of the solenoid 27 and conductor 57, thus causing an actuation of the solenoid to eject the tube having the broken filament, the mechanical operations for this purpose having been hereinbefore described.

By reference to Fig. 7 it will be seen that the conductive track 22 is provided with insulated sections 104 so that the electrical circuit to operate the relay 62 is not effective until the brushes 88 and 89 are both in contact with conductive portions of the track.

If a short circuit occurs between the filament and the plate, the filament being continuous, the relay E will be short circuited resulting in an actuation of the relay 62 to operate the solenoid 27. If a short circuit occurs between the filament to the grid, the relays E and D will be short circuited resulting in an actuation of the relay 62 and the operation of the solenoid 27. If a short circuit occurs between the plate and grid, the relay D will be short circuited resulting in an actuation of the relay 62 and the operation of the solenoid 27.

From the above, the operation of ejecting a tube having a broken filament or a short circuit between the filament grid, filament plate or grid and plate terminals will be readily understood.

*Circuit B*

This circuit is generally the same as circuit A but also provides for the testing of low emission and gassy tubes as well as for the defects which affect the circuit A.

As illustrated, a socket 11 is connected by the same leads and electrically associated with the same tracks on the conveyor 10 as the socket for the circuit A. It is, of course, understood that all the sockets on the conveyor with their leads are similar except that each circuit has an individual set of brushes, the tracks being divided into sets, each circuit having an independent set of tracks. The brushes for circuit B are indicated by the numerals 105, 106, 107 and 108, the brushes for the solenoid circuit being indicated by the numerals 109 and 111. The brush 105 is connected by a conductor 112 to source of energy 51 through conductor 54. Brush 106 is connected to a conductor 113, resistance 114 and conductors 115, 53 which lead to the source 51, thus completing the filament circuit. A volt meter 116 may be provided to give a visible indication of the potential on the filament. The brush 107 may be connected by a conductor 117, a protective resistance 118, conductor 119 which connects a pair of micro-ammeters 121 and 122 in series. The micro-ammeter 122 being especially constructed and hereinbefore designated as a whole by the reference character H. The micro-ammeters are connected by conductor 123 to a battery 124 having a lead 125' connecting to the positive terminal thereof, the opposite end of the lead being connected to the minus terminal of a battery 126. This battery is provided with a lead 127 connected to coil 130 of the master relay K having a conductor 129 which is connected to the milli-ammeter L, the opposite side of the milli-ammeter being connected by conductor 132 to the protective relay M which is connected by a conductor 134 to brush 108. The protective relay M operates in the manner hereinbefore described.

The brush 109 of the solenoid circuit is connected to a conductor 135 which terminates in a contact 136 in operable relation to an arm 137' of the relay 63, which is connected to a conductor 138 leading to the conductor 58 connected to the 130 volt D. C. line 55. A lead 139 connected to the opposite lead 57 of the said line provides for a flow of current to the coil 60 of the solenoid 28 an end of said coil being connected by a conductor 141, resistance 142 and lead 143 to brush 111 of the solenoid circuit.

Electrical energy for actuating the relay 63 is supplied from source 51 through conductor 144 which may be connected to conductor 145 by a switch 146. The conductor 145 being connected to a conductor 146' terminating in contacts 147 and 147' of the relay K, movable arm 148 of this relay being connected to a conductor 149 which connects to the coil of the relay 63. It will be evident that the relay 63 is thus governed by the control relay K. Electrical energy for actuating this control relay is supplied from batteries 124 and 126.

In this circuit, if a tube is applied to a socket 11 and the emission or grid current is less than a predetermined value the relay K has not sufficient current to operate and the contact 147' remains closed causing an actuation of the solenoid 28 to eject a tube. The same operation would occur if the filament were broken.

The circuit B also provides for the ejection of tubes having too high a gas current and the circuit includes means in the form of the selenium cell I for controlling a circuit to cause an ejection of gassy tubes. For the purpose of more clearly understanding the operation of the selenium cell in connection with the present circuit, reference may be had to Figs. 8, 9 and 10 of the drawing which give a diagrammatic representation of a device employing a micro-ammeter indicated by the reference character H and hereinbefore briefly described. This meter may have a black cardboard face or shelf 152 substituted for the usual scale thereof. The cardboard may be provided with an aperture 153 under which a mirror 154 is positioned (see Fig. 10). The pointer on this meter may be provided at one end with a shutter 156 and the opposite end may be counterbalanced by miniature weights 157 and 158. The pointer may be so positioned that the shutter 156 will normally cover the aperture 153 and may be so arranged that when the pointer or needle swings past two microamperes or other specified limit, light rays from a suitable source as, for example, a lamp bulb 159 will be focused on the mirror 154 and reflected to the selenium cell I. The light rays from the bulb 159 may be focused and concentrated upon the mirror by suitable lenses 162 and 163. The cell I during its normal or inactive state serves as a resistance to prevent the flow of energy from a battery 164 which is provided to supply energy to actuate master relay J, which relay in turn closes another circuit for supplying energy to actuate the solenoid 28 for ejecting a tube. Thus if the pointer moves the shutter 156 to permit light to be reflected to the cell I a flow of energy will flow through the relay J.

Referring again to the circuit B, Fig. 6, the selenium cell I is shown adjacent to the micro-ammeter H which may be modified as above described. The source of light in the form of the small incandescent lamp 159 may receive current through conductors 166 and 167 associated with a battery or other source.

It will be seen that the micro-ammeter H is included in the plate circuit and that the gas current in a tube to be tested will affect the micro-ammeter with a consequent flow of current in its circuit to operate the solenoid and eject the tube. For example, if a tube is placed in the socket 11 with not over the specified amount of gas, the needle of the micro-ammeter H will be disposed with the shutter over the aperture 153. If the gas is too high, the needle will move exposing the mirror to the light rays which are then reflected to the selenium cell I reducing the resistance of the cell and permitting energy to flow through battery 164, through a milli-ammeter 171, conductor 172, the relay J, another conductor 173 to complete the circuit of energy flowing from the battery 164 effecting an actuation of the relay J causing the movable arm 174 thereof to engage with the contact 175 connected to conductor 176 which connects with the coil of the relay 63, the opposite end of the coil of the said relay being connected by conductor 177 to conductor 54 of the electrical source 51. The movable arm 174 of the relay J is connected by conductor 178 to conductor 53 of the source 51. Thus when this relay J is actuated, a flow of current will occur in the relay 63 and the movable arm 137' thereof will be disposed in engagement with the contact 136, connecting with the brush 109, so when the two brushes are connected by the conductive ring 22, electrical energy will flow from the brush 111, lead 143, through the solenoid 28, lead 139 which is connected to the conductor 57, communicating with the 130 volt D. C. line 55. The opposite conductor 58 of this line is connected by a conductor 138 to the movable arm 137 of the relay 63. A flow of current through the solenoid will obviously actuate the same and eject any tube which may not have the proper gas current. It will be evident that in such case, a high gas contact causes ionization with a consequent high gas current to effect a movement of the pointer associated with the micro-ammeter H, causing the shutter 156 thereof to move and admit light to the mirror which when reflected to the selenium cell will cause an operation of the solenoid 28 which latter operates in the same manner as described for a tube having low emission. It will further be evident that a leak between the minus and plus filament to the plate will increase the flow of electrical energy through the micro-ammeter with the same result as follows an excess of gas current in the tube, and, inasmuch, as leakage across the elements is a form of defect the tube will be ejected.

If a short circuit occurs between the filament and grid, an excess flow of current through the relay K will cause an actuation thereof in the manner above described. A short circuit between the plate and grid will operate to not only cause an actuation of the relay K, but will also effect a variation in the flow of current through the micro-ammeter H, thus actuating the needle thereof and causing an operation of the selenium cell I to actuate the solenoid 28 and a short circuit between the filament and plate will cause an operation of the solenoid 28 through the selenium cell.

From the above, it will be evident that the circuit B not only operates to eject tubes of low emission or too high gas content, but serves as a check on tubes with broken filament and the like, inasmuch, as if the filament is broken, the other defects which affect this circuit will be present.

*Circuit C*

This circuit is affected by tubes of too low or too high plate current, also broken filaments and short circuits between the plus and minus filament to the plate. The circuit includes a set of brushes 181, 182, 183 and 184 adapted to contact with the tracks 17, 18, 19 and 21 respectively, a pair of solenoid brushes 185 and 186 are also provided to contact with the conductive track 22.

The socket 11 is provided with the leads from the contacts of the socket to the tracks as above described and as shown, filament current may be supplied from a conductor 187 connected to brush 181 and to the conductor 54, conductor 188, resistance 189 and conductor 191 connected to lead 53, it being understood that the conductor 54 and the lead 53 supply energy from the source 51. For the purpose of taking a reading of voltage, a voltmeter 190 may be shunted across conductors 187 and 181. Inasmuch as this circuit operates to indicate the variations in the plate current, it will be evident that it also indicates a broken filament since if the filament is inoperative, the plate current is zero.

For the purpose of actuating the solenoid 29 when the plate current varies, the master relay N is provided, and includes contacts 193 and 194 connected by a conductor 195 which connects with one side of the source of energy 51. Arm 196 of this relay is connected to one end of the coil of power relay 64, the opposite end of the coil being connected to conductor 197 through which energy is supplied from the opposite side of the source 51. One end of coil 195′ of the relay N is energized by a flow of current between the plate and grid, the brush 183 being connected to conductor 183′, a protective relay P and conductor 185′. The opposite end of the coil 195′ being connected by conductor 196′ to conductor 54.

When a tube is applied to the socket 11 and the plate current is of the proper degree, the arm 196 of the relay N will remain away from the contacts, a variation in the flow of energy will, however, cause the arm 196 to make contact and actuate an arm 198 of relay 64, causing it to engage with a contact 199 connected to a conductor 201 which terminates in the solenoid brush 185 which connects with the brush 186 through the track 22. The brush 186 may be connected to one end of the coil 61 of the solenoid 29 through resistance 202, the opposite end of the coil of the solenoid is connected to conductor 203 leading to the 130 volt D. C. line 55; a return flow of current from said line is obtained by means of conductor 204 connected to arm 198 of the relay 64 upon the energization of said relay.

Inasmuch as the relay N may have the needle or arm thereof set for a given amount of current, it will be evident that all tubes outside of the predetermined range will be ejected. In the event of a short circuit between a minus or plus filament to the plate an excess flow of current will occur with the resultant operation of the solenoid 29 to eject the tube. Means are provided for the purpose of a voltage check from time to time on the bias battery 126 in grid lead of circuit B, battery 126′ in plate lead of circuit C and battery 126″ in the grid lead of circuit C. This means may comprise a selective switch 206 in series with which is provided a voltmeter 207.

At various places through the circuit, indicator lights or means may be employed to give visible indication when the current is flowing through the relay which actuates the solenoid, for example, a small bulb 205 may be placed across the coils of the relays 62, 63 and 64.

These indicator lights give a constant visible indication as to whether or not a tube meets the requirements necessary to an operative device. As soon as a tube or other device to be tested is applied as part of the circuit and the current flows within the desired range, the indicator lights will go out, whereas, if the tube is defective and no current flows, an immediate indication of such condition is readily determined by the lamps being illuminated.

When arranging the present apparatus so that the electrical system constitutes a unitary compact arrangement, the lamps may be so disposed that an inspection thereof may be had at any time and a convenient check may be made to determine whether or not the mechanical mechanism is being properly operated to discharge the tubes.

In the operation of the device, the conveyor 10 is continuously rotated, the tubes or other devices to be tested may be fed either manually or automatically to the conveyor. As soon as a tube is applied to a socket it is, of course, electrically connected with the tracks upon the conveyor. The first movement of the conveyor positions the tube in operative relation to circuit A, thus subjecting the tube to the various instrumentalities of circuit A since the tube is temporarily part of this circuit. If the tube contains one or more of the defects enumerated as affecting this circuit, the tube is automatically ejected into chute 37. If the tube does not contain one of the defects affected by this circuit, it is moved to operable relation with the circuit B and if other defects exist to which this circuit B is susceptible, the tube is ejected into chute 38. If the tube passes the first two circuits but contains one of the defects affecting the circuit C, it is ejected into chute 39. A good tube will, of course, pass the various circuits to which it is subjected and is finally ejected by the permanent cam member 42 into chute 41 or on to any suitable conveyor as an apron or belt for removal from the machine.

From the foregoing, it will be appreciated that each of the circuits A, B and C is provided with a master relay which normally operates to maintain a power circuit which operates the solenoid. This means that in order for a tube to pass through all the circuits, it must have a flow of current sufficient to maintain the master relays operative to open the solenoid circuit to prevent an actuation of the same to eject the tube. Furthermore, the master relays may be so adjusted that the flow of current which operates them to prevent an actuation of the solenoid must be of a predetermined degree or within a given range. From this it will be evident that a tube must be an operative tube in so far as a flow of current is concerned before it can pass from one circuit to the other. Inasmuch as this is true of all the circuits, it is practically impossible for a bad tube to be ejected with the good tubes.

Another important feature of the present apparatus consists in the arrangement of the moving contacts whereby the control circuits which operate to cause a flow of current in the power or solenoid circuit are so arranged that before the ejector mechanism is operated a time interval is provided to permit the various instrumentalities of the control circuits to come to rest and not until such condition exists will the current flow in the ejector circuit. This condition makes the operation positive and is attained by reason of the brushes and tracks which are provided for the control portions of the circuit and the independent track or contact member employed to permit a flow of current through the power or ejector circuit.

It will be understood that if desirable, instead of having a circuit operable to eject tubes having a plurality of defects, the circuits could be divided so as to eject a tube into a separate chute for each defect that might occur so that the tubes would be automatically assorted, those having like defects being disposed in common groups. The present machine or system has, however, been constructed to classify certain defects which require the same treatment for a recovery or rejuvenation of the tubes. As above explained, tubes with broken filaments are considered as wholly defective and since such tubes are discharged into a common chute, they may readily be removed. Tubes having good filaments but being low in emission etc., are also guided together and may be reseasoned, while tubes with high or low plate voltage are also guided together and may be made operable by an adjustment of the elements.

As to different types of radio tubes, it is obvious that the necessary change in values, socket sizes, etc., may be made to accommodate any type of tube to be tested.

The importance of the present invention will be more readily appreciated when it is recognized that all radio tubes produced in accordance with proper standards must fall within certain requirements as to their several characteristics. It has heretofore been necessary to employ a crew of operators to handle the tubes for testing and owing to the large volume of articles of this kind produced, it follows that a great amount of time and labor was expended in this operation. Furthermore, accuracy is an essential element in connection with the manufacture of radio tubes or like devices and where the testing operation depends upon the integrity, skill and acuteness of the operators in performing their work, it is difficult to have all devices properly tested.

By reason of the present invention, the human element in so far as the accurate determination of the characteristics of the various tubes is concerned, has been eliminated and in addition, the speed at which the testing operation is performed has been greatly increased. Whereas, heretofore, an operator could only test 250 tubes per hour, the present machine operating well within its maximum limits will test 6,000 tubes or above per hour.

By reason of the fact that the present machine operates as a final check upon the operativeness of the devices tested and since it will discharge good or operative tubes into a common group, it would be evident that such tubes may be automatically removed to position for packing, or the tube may be pushed directly into a carton from the unloading position. For example, the present machine may be provided with belt conveyors instead of the chutes shown, one belt being adapted to carry the good tubes through a given path in position to be picked up by a suitable number of packers who may deposit the tubes in the usual containers and pack the same for shipment. The tubes to be reseasoned may be conveyed away to a suitable remote point for the subsequent reclaiming operation while the entirely bad tubes may, of course, be deposited in any suitable receptacle.

Inasmuch as the machine operates at a high speed, it will be appreciated that the testing operation may be performed upon large volumns of tubes at a relatively low cost and with a minimum amount of handling.

From the above it will be seen that the present method and apparatus constitutes a decided advanced step in the manufacture of electron emission devices or other articles which require a test through the agency of an electric current.

Although a preferred embodiment of the invention is shown and described herein, it is to be understood that modifications may be made therein without departing from the spirit and scope of the invention as set forth in the appended claims.

What is claimed is:

1. An electrical testing apparatus comprising an electrical circuit, means for temporarily moving a device to be tested in operable relation to said circuit for the flow of electrical energy therethrough and means operable upon an insufficient or excess flow of energy through said device to remove said device from said circuit.

2. An electrical testing apparatus comprising an electrical circuit, means for moving a radio tube temporarily in operable relation to said circuit, discharge mechanism for removing a tube from said circuit and means associated with said circuit for actuating said discharge mechanism upon an insufficient or excess flow of energy through said tube.

3. An electrical testing apparatus comprising an electrical circuit, means for positioning a radio tube temporarily in operable relation to said circuit, means for causing a flow of energy in said circuit, tube-removing means, means associated with said circuit for actuating said tube-removing-means upon an insufficient or excess flow of energy through said tube.

4. An electrical testing apparatus comprising an electrical circuit including a radio tube, means for removing a tube from said circuit and means associated with said circuit for causing an actuation of said first mentioned means upon an insufficient or excess flow of energy through said tube.

5. A machine for testing electrical devices comprising an electrical circuit adapted to include one of said devices, means for removing said device from said circuit upon an insufficient or excess flow of energy through said device.

6. An electrical testing apparatus comprising an electrical circuit, means for temporarily including in said circuit a device to be tested, a source of electrical energy for said circuit, a second circuit, a relay interposed between said circuits and operable to close said second circuit, a solenoid controlled by said second circuit capable of ejecting said device, said relay being operable upon a given flow of current through said device to cause an actuation of said solenoid.

7. An electrical testing apparatus comprising an electrical circuit, means for temporarily including in said circuit a device to be tested, a source of electrical energy for said circuit, a second circuit, a relay interposed between said circuits and operable to close said second circuit, mechanism electrically controlled by said second circuit capable of ejecting said device, said relay being operable upon a given flow of current through said device to cause an actuation of said mechanism.

8. An electrical testing apparatus comprising an electrical circuit, means for supporting a device to be tested in position as a temporary part of said circuit, means for ejecting a device from said circuit controlled by a flow of electrical energy, and means controllable by the degree of the flow of energy through said device for removing said device from said circuit.

9. An electrical testing apparatus comprising an electrical circuit, means for temporarily supporting a device to be tested in operable relation to said circuit, a second circuit, for causing a removal of said device when said circuit is energized, a resistance for normally preventing a flow of current through said second circuit, and means for removing said resistance upon a flow of current of a predetermined degree in said first mentioned circuit.

10. An electrical testing apparatus comprising an electrical circuit, means for temporarily supporting a device to be tested in operable relation to said circuit, a second circuit, an electrically actuated mechanism controlled by said second circuit for causing a removal of said device when said circuit is energized, a selenium cell in said second circuit for normally maintaining the same closed and means for causing a flow of current through said cell upon the flow of a predetermined amount of current in said first mentioned circuit.

11. A machine for testing radio tubes comprising a movable support for a tube, an electrical circuit, means for moving said support to connect said tube in said circuit, electrically controlled mechanism, a normally closed power-circuit for said mechanism, and means for opening said power circuit in the presence of a flow of energy through a tube in said first mentioned circuit.

12. A machine for testing radio tubes comprising a movable support for a tube, an electrical circuit, means for moving said support to connect said tube in said circuit, electrically controlled mechanism, a normally closed power circuit for said mechanism, and means for opening said power circuit upon a flow of energy through the tube in said first mentioned circuit.

13. A machine for testing radio tubes comprising a movable support for a tube, an electrical circuit, means for moving said support to connect said tube in said circuit, electrically controlled mechanism, a normally closed power circuit for said mechanism, and means for opening said power circuit upon a flow of energy through the tube in said first mentioned circuit and means for preventing a flow of energy in said power circuit upon the flow of a predetermined amount of energy through said tube.

14. A machine for testing radio tubes comprising an electrical circuit and a source of electrical energy therefor, means for connecting a tube in said circuit and means operable upon a flow of electrical energy under or above a given amount between the plate of said tube and other elements thereof to remove the tube from said circuit.

15. A machine for testing radio tubes comprising an electrical circuit and a source of energy therefor, means for connecting a tube to said circuit for the passage of electrical energy through the filament of said tube, another circuit connectible to the other elements of said tube and means operable upon the flow of gas current through said tube above a predetermined amount to remove the tube from said circuit.

16. An electrical testing apparatus comprising an electrical circuit, means for temporarily supporting a device to be tested in operative relation to said circuit, a second circuit, a solenoid energizable upon a flow of energy through said second circuit, said solenoid being operable to remove a device from said circuit, a selenium cell normally operating to prevent a flow of energy through said second circuit, a source of light and means for directing said light upon said cell to permit a flow of energy through said second circuit upon the passage of a predetermined amount of electrical energy through said device.

17. An electrical testing apparatus comprising an electrical circuit, means for temporarily supporting a device to be tested in operative relation to said circuit, a second circuit, electrically actuated mechanism energizable upon a flow of energy through said second circuit, said mechanism being operable to remove a device from said circuit, a selenium cell normally operating to prevent a flow of energy through said second circuit, a source of light and means for directing said light upon said cell to permit a flow of energy through said second circuit upon the passage of a predetermined amount of electrical energy through said device.

18. A machine for testing radio tubes comprising a filament circuit, a circuit for other elements of said tube, means for connecting a tube to said circuits, a meter in said second mentioned circuit for registering the flow of gas current in said tube and means operable upon the movement of the pointer of said meter a predetermined degree to remove said tube from the circuits.

19. A machine for collecting radio tubes passing predetermined amounts of gas current comprising a circuit for the flow of said current, an electrically operated mechanism for removing a tube from said circuit, a selenium cell arranged to normally provide a resistance and prevent electrical energy from actuating said mechanism, a source of light directed on said cell to decrease the resistance thereof, a meter in said circuit, a pointer on said meter having a shutter normally preventing light from reaching said cell, said meter operating to move said pointer upon the flow of a predetermined amount of current in said circuit to permit the passage of light to said cell to cause an actuation of said mechanism to remove said tube.

20. An electrical testing system comprising a circuit organization composed of a plurality of auxiliary circuits, each of said auxiliary circuits being adapted to test a radio tube for given defects, and means individual to each of said auxiliary circuits for ejecting a tube defective with respect to the tests made thereby.

21. An electrical testing apparatus comprising an electrical circuit, means for supporting a device to be tested as part of said circuit, a second circuit and source of energy therefor, a power circuit, an electrically actuated mechanism in said power circuit, a relay in said second circuit controlling said power circuit, said relay operating to close said power circuit upon a flow of energy in said first circuit, a relay in said first circuit operable to terminate a flow of energy in the relay controlling said second circuit and open said power circuit upon a flow of energy through said device and said first circuit.

22. An electrical testing apparatus comprising an electrical circuit, means for supporting a device to be tested as part of said circuit, a second circuit and source of energy therefor, a power circuit, an electrically actuated mechanism in said second circuit, a relay in said second circuit controlling said second circuit, said relay operating to close said second circuit upon a flow of energy in said first circuit, a relay in said first circuit operable to terminate a flow of energy in the relay controlling said second circuit and open said second circuit upon a flow of energy through said device and said first circuit and means for separating devices through which energy flows from devices through which energy does not flow.

23. An electrical testing apparatus comprising an electrical circuit, a conveyor for moving a device to be tested to constitute a portion of said circuit, a source of electrical energy for said circuit, a normally closed second circuit and a source of energy therefor, a solenoid operable upon a flow of energy through said second circuit to remove a device from said conveyor and a relay operable to terminate a flow of energy through said second circuit upon the flow of electrical energy through said device.

24. An electrical testing apparatus comprising an electrical circuit, a conveyor for moving a device to be tested in operable relation to said circuit, a source of electrical energy for said circuit, a normally closed second circuit and a source of energy therefor, electrically controlled mechanism operable upon a flow of energy through said second circuit to remove a device from said conveyor, a relay in said first mentioned circuit and a relay in said second circuit for controlling said mechanism, said first mentioned relay being operable upon a flow of energy through said first mentioned circuit to affect said second relay and terminate a flow of energy through said second circuit.

25. The method of testing an electrical device for a determination of the flow of electrical energy therethrough which comprises positioning the device in an electrical circuit including registering the degree of flow of electrical energy through said device, causing a flow of electrical energy through a supplemental circuit upon a variation in the flow of energy through the first mentioned circuit and in utilizing the electrical energy passed through the second circuit to cause a removal of said device from said circuit.

26. The method of testing an electrical device for a determination of the flow of energy therethrough which comprises placing the device in an electrical circuit, causing a flow of energy through said circuit, utilizing variations in the flow of energy through said device to cause a variation in the electrical flow in said circuit and affect another circuit and cause a removal of said device from said first mentioned circuit.

27. The method of testing an electrical device for a determination of the flow of energy therethrough which comprises placing the device in an electrical circuit, causing a flow of energy through said circuit, utilizing variations in the flow of energy through said device to cause a variation in the electrical flow in said circuit and affect another circuit to effect a removal of the device from the first mentioned circuit, and in guiding devices passing like amounts of energy into groups.

In testimony whereof, I have hereunto subscribed my name this 15th day of February, 1927.

ALLEN B. DU MONT.